United States Patent
Gu et al.

(10) Patent No.: US 12,284,240 B2
(45) Date of Patent: Apr. 22, 2025

(54) CLOUD COMPUTING POWER ALLOCATION METHOD, USER TERMINAL, CLOUD COMPUTING POWER PLATFORM AND SYSTEM

(71) Applicant: HANGZHOU CANAAN INTELLIGENCE INFORMATION TECHNOLOGY CO., LTD, Zhejiang (CN)

(72) Inventors: Suncheng Gu, Zhejiang (CN); Nangeng Zhang, Zhejiang (CN)

(73) Assignee: HANGZHOU CANAAN INTELLIGENCE INFORMATION TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 17/928,901

(22) PCT Filed: May 24, 2021

(86) PCT No.: PCT/CN2021/095456
§ 371 (c)(1),
(2) Date: Nov. 30, 2022

(87) PCT Pub. No.: WO2021/244343
PCT Pub. Date: Dec. 9, 2021

(65) Prior Publication Data
US 2023/0229215 A1 Jul. 20, 2023

(30) Foreign Application Priority Data
Jun. 1, 2020 (CN) .......................... 202010484535.6

(51) Int. Cl.
G06F 1/26 (2006.01)
H04L 67/10 (2022.01)
(Continued)

(52) U.S. Cl.
CPC ................ *H04L 67/10* (2013.01); *G06F 1/26* (2013.01); *H04L 67/104* (2013.01); *H04L 67/02* (2013.01)

(58) Field of Classification Search
CPC ....................................................... G06F 1/26
See application file for complete search history.

(56) References Cited

U.S. PATENT DOCUMENTS

2010/0306354 A1* 12/2010 DeHaan ................ G06F 9/5072
718/1
2013/0304923 A1 11/2013 Clay et al.
(Continued)

FOREIGN PATENT DOCUMENTS

CN 109062687 A 12/2018
CN 109117608 A 1/2019
(Continued)

OTHER PUBLICATIONS

Extended European Search Report issued in European Patent Application No. 21818380.4, mailed Jun. 3, 2024, 9 pages.
(Continued)

*Primary Examiner* — Stefan Stoynov
(74) *Attorney, Agent, or Firm* — McDonnell Boehnen Hulbert & Berghoff LLP (57) ABSTRACT

Provided are a cloud computing power allocation method, a user terminal, a cloud computing power platform, and a system. The method includes: generating a computing power request including a computing power demand and account information of a computing power scheduling center; sending the computing power request to a cloud computing power platform, so that the cloud computing power platform sends a configuration instruction to a computing device cluster according to the computing power request, where the configuration instruction is to allocate to the user terminal a target computing device meeting the computing (Continued)

power demand from the computing device cluster and configure based on the account information the target computing device to execute a computing task issued by the computing power scheduling center; and acquiring from the computing power scheduling center computing power information determined according to a computing result from the target computing device, by using the account information.

19 Claims, 4 Drawing Sheets

(51) Int. Cl.
  *H04L 67/104* (2022.01)
  *H04L 67/02* (2022.01)

(56) References Cited

U.S. PATENT DOCUMENTS

| | | | |
|---|---|---|---|
| 2014/0052506 A1* | 2/2014 | Lee | G06Q 30/0207 |
| | | | 705/14.1 |
| 2014/0282944 A1 | 9/2014 | Li | |
| 2017/0004182 A1 | 1/2017 | Simpson et al. | |
| 2017/0351554 A1* | 12/2017 | Lim | G06F 9/5072 |

FOREIGN PATENT DOCUMENTS

| | | |
|---|---|---|
| CN | 110532092 A | 12/2019 |
| CN | 110851529 A | 2/2020 |
| CN | 111240836 A | 6/2020 |
| CN | 112465359 A | 3/2021 |
| WO | 2019/227336 A1 | 12/2019 |

OTHER PUBLICATIONS

Communication pursuant to Rules 70(2) and 70a(2) EPC issued in European Patent Application No. 21818380.4, mailed Jun. 20, 2024, 1 page.

* cited by examiner

CLOUD COMPUTING POWER ALLOCATION METHOD, USER TERMINAL, CLOUD COMPUTING POWER PLATFORM AND SYSTEM

This application is a U.S. national phase of International Application No. PCT/CN2021/095456, filed on May 24, 2021, which claims priority to Chinese Application No. 202010484535.6, filed Jun. 1, 2020, both of which are incorporated by reference herein in their entirety.

TECHNICAL FIELD

The invention belongs to the field of blockchain, and in particular relates to a cloud computing power allocation method, a user terminal, a cloud computing power platform and a system.

TECHNICAL BACKGROUND

This section is intended to provide background or context for the embodiments of the present disclosure as recited in claims. The description herein cannot be regarded as prior art by virtue of its inclusion in this section.

With the development of blockchain technologies, the demand for cloud computing power is rising continually. The greatest advantage of the cloud computing power is that its cost is lower and the steps for a user to manage a processing equipment for accounting vouchers can be saved, and the user merely needs to purchase non-physical cloud computing power remotely and computing tasks can be performed by cloud computing power.

However, in the prior art, solutions for providing the cloud computing power are still complex and the configuration is not flexible. Moreover, because of the non-physical nature of cloud computing power, it is difficult for the user to determine whether the cloud computing power provided by the cloud computing power platform is real and reliable.

SUMMARY OF THE INVENTION

Regarding the problems in the prior art that the solutions for providing the cloud computing power are still complex and that it is difficult to determine whether the cloud computing power is real and reliable, embodiments of the present disclosure provide a cloud computing power allocation method, a user terminal, a cloud computing power platform and a system. According to this method and system, the above problems can be solved.

Embodiments of the present disclosure provide following solutions.

In a first aspect, provided is a cloud computing power allocation method applicable to a user terminal. The method includes: generating a computing power request, where the computing power request includes a computing power demand and account information of a computing power scheduling center; sending the computing power request to a cloud computing power platform, so that the cloud computing power platform sends a configuration instruction to a computing device cluster according to the computing power request, where the configuration instruction is to allocate, to the user terminal, a target computing device meeting the computing power demand from the computing device cluster, and configure, on the basis of the account information, the target computing device to execute a computing task issued by the computing power scheduling center; and acquiring computing power information from the computing power scheduling center by using the account information, where the computing power information is determined according to a computing result of the computing task executed by the target computing device.

In a possible embodiment, the computing power demand includes at least one validity period, and the method further includes: receiving a reminder message sent by the cloud computing power platform when current time reaches a reminder time point prior to the end of the validity period; and/or sending a renewal request to the cloud computing power platform, so that the cloud computing power platform updates the validity period based on the renewal request.

In a possible embodiment, the computing power request further includes transaction information, and the method further includes: sending the computing power request including the transaction information to the cloud computing power platform, so that the cloud computing power platform verifies the transaction information and sends the configuration instruction to the computing device cluster after verification is passed.

In a possible embodiment, the method further includes receiving and presenting an operational state of the target computing device sent by the cloud computing power platform.

In a possible embodiment, the computing power information includes actual computing power and computing revenue of the target computing device, and the computing revenue is a digital certificate.

In a second aspect, provided is a cloud computing power resource scheduling method applicable to a computing power platform. The method includes: receiving a computing power request sent by a user terminal, where the computing power request includes a computing power demand and account information of a computing power scheduling center; and sending a configuration instruction to a computing device cluster according to the computing power request, where the configuration instruction is to allocate, to the user terminal, a target computing device meeting the computing power demand from the computing device cluster, and configure, on the basis of the account information, the target computing device to execute a computing task issued by the computing power scheduling center.

In a possible embodiment, the computing power demand includes at least one validity period, and the method further includes: sending a reminder message to the user terminal when the current time reaches a reminder time point prior to the end of the validity period; and/or receiving a renewal request sent by the user terminal to update the validity period; and/or sending a termination instruction to the computing device cluster when the current time exceeds the validity period, so that the target computing device is disconnected from the computing power scheduling center based on the termination instruction.

In a possible embodiment, the computing power request further includes transaction information, and the method further includes: verifying the transaction information, and sending the configuration instruction to the computing device cluster after the verification is passed.

In a possible embodiment, the method further includes: receiving an operational state of the target computing device sent by the computing device cluster, and sending the operational state of the target computing device to the user terminal.

In a possible embodiment, the method further includes: establishing a connection with the computing power scheduling center based on the account information; and receiving computing power information sent by the computing power scheduling center, where the computing power information is determined according to a computing result of the computing task executed by the target computing device.

In a possible embodiment, the computing power information includes actual computing power and computing revenue of the target computing device, and the computing revenue is a digital certificate.

In a third aspect, provided is a user terminal. The user terminal includes: a processor adapted to implement one or more instructions, and a computer storage medium storing one or more instructions, where the one or more instructions are adapted to be loaded by the processor and to execute the method according to the first aspect.

In a fourth aspect, provided is a cloud computing power platform, and the cloud computing power platform includes: a processor adapted to implement one or more instructions, and a computer storage medium storing one or more instructions, where the one or more instructions are adapted to be loaded by the processor and to execute the method according to the second aspect.

In a fifth aspect, provided is a cloud computing power scheduling system, and the system includes: a user terminal, a cloud computing power platform, a computing device cluster and a computing power scheduling center. The user terminal is configured to send a computing power request to the cloud computing power platform, where the computing power request includes a computing power demand and account information of a computing power scheduling center. The cloud computing power platform is configured to send a configuration instruction to the computing device cluster according to the computing power request. The computing device cluster is configured to allocate a target computing device meeting the computing power demand to the user terminal in response to the configuration instruction, and configure the target computing device based on the account information to connect to the computing power scheduling center. The computing power scheduling center is configured to allocate a computing task to the target computing device and generate computing power information based on a computing result returned by the target computing device. The user terminal is further configured to receive the computing power information sent by the computing power scheduling center.

In a possible embodiment, the computing power request includes at least one validity period. The cloud computing power platform is further configured to send a reminder message to the user terminal when the current time reaches a specific time point prior to the end of the validity period; and/or, the user terminal is further configured to send a renewal request to the cloud computing power platform, and the cloud computing power platform is further configured to update the validity period based on the renewal request; and/or the cloud computing power platform is further configured to send a termination instruction to the computing device cluster when the current time exceeds the validity period, and the computing device cluster disconnects the target computing device from the computing power scheduling center based on the termination instruction.

In a possible embodiment, the computing power request further includes transaction information, and the cloud computing power platform is further configured to verify the transaction information, and send the configuration instruction to the computing device cluster after the verification is passed.

In a possible embodiment, the cloud computing power platform is further configured to receive an operational state of the target computing device sent by the computing device cluster, and send the operational state of the target computing device to the user terminal.

In a possible embodiment, the cloud computing power platform is further configured to establish a connection with the computing power scheduling center based on the account information, and the computing power scheduling center is further configured to send computing power information to the cloud computing power platform.

In a possible embodiment, the computing power information includes actual computing power and computing revenue of the target computing device, and the computing revenue is a digital certificate.

The above at least one technical solution used in the embodiments of the present disclosure can achieve the following beneficial effects. By using the cloud computing power platform, a target computing device is virtually allocated to the user, and the computing task issued by a third-party computing power scheduling center is performed, so that the complexity of a user acquiring the computing power is reduced. Also, the user can obtain the real computing power information of the target computing device allocated by the cloud computing power platform to the user through the third-party computing power scheduling center, so that the authenticity and reliability of computing power allocation is ensured.

It should be noted that the above description is only a summary of the technical solutions of the present disclosure, so that technical means of the present disclosure can be more clearly understood, thereby implementing the present disclosure according to the contents described in the specification. The detailed description of the present disclosure is specifically exemplified below to make the above and other objects, features, and advantages of the present disclosure more clearly understood.

BRIEF DESCRIPTION OF THE DRAWINGS

The advantages and benefits described herein and other advantages and benefits will be apparent to those of ordinary skill in the art by reference to the following detailed description. The accompanying drawings are for the purpose of illustrating exemplary embodiments only and are not intended to be a limitation of the present disclosure. Further, a same reference numeral indicates a same component throughout the accompanying drawings. In the accompanying drawings.

In the accompanying drawings, the same or corresponding reference numerals indicate same or corresponding components.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "including" or "having" are intended to indicate the presence of the features, numbers, steps, actions, components, parts or a combination thereof as disclosed by the specification, and does not exclude the possibility to include one or more other features, numbers, steps, actions, components, parts or a combination thereof.

Furthermore, it should be noted that the embodiments of the present disclosure and features of the embodiments may be combined with each other as long as they are not contradictory. The present disclosure will be described in detail below with reference to the accompanying drawings and embodiments.

Figure 1:
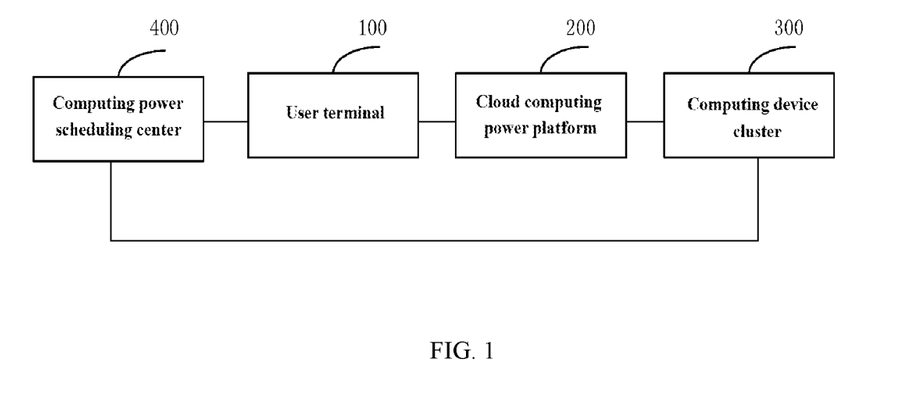
FIG. 1 is a schematic structural diagram of a cloud computing power allocation system according to an embodiment of the present disclosure.

As shown in FIG. 1, embodiments of this specification provide a cloud computing power allocation system applicable to the field of blockchain, and the system includes a user terminal 100, a cloud computing power platform 200, a computing device cluster 300 and a computing power scheduling center 400.

The user terminal 100 is configured to send a computing power request to a cloud computing power platform 200. The computing power request includes a computing power demand and account information of a computing power scheduling center 400.

The cloud computing power platform 200 is configured to send a configuration instruction to the computing device cluster 300 according to the computing power request.

The computing device cluster 300 is configured to allocate a target computing device meeting the computing power demand to the user terminal 100, and configure the target computing device to connect to the computing power scheduling center 400 based on the account information.

The computing power scheduling center 400 is configured to allocate a computing task to the target computing device and generate computing power information based on a computing result returned by the target computing device.

The user terminal 100 is further configured to acquire the computing power information by logging in to the computing power scheduling center 400 using the account information.

In embodiments of this specification, the user terminal 100 may be a smartphone, laptop, tablet, desktop computer, and the like; and the cloud computing power platform 200 may be a server for providing computing power allocating services.

The computing device cluster 300 may be a plurality of computing devices concentrated in a specific local area network. The computing device is a digital blockchain computing device, or also referred to as a miner that is actually a computer including a dedicated computing processing chip or a high-performance graphics card. The computing device continuously performs mathematical operations in the network to acquire blockchain reward revenue. The computing device cluster 300 may also be referred to as a mining farm, where dozens or hundreds or thousands of computing devices may perform the mathematical computation together to acquire the blockchain reward revenue.

The computing power scheduling center 400 is an open, fully automated mining platform that integrates computing power of the plurality of computing devices. In addition, the computing power scheduling center 400 does not perform mining calculations itself, but allocates computing tasks to the computing devices connected to the computing power scheduling center 400.

For example, by taking user A as an example, the user A may pre-register for a third-party computing power scheduling center 400 and acquire the account information (e.g., URL link address, user ID, user password of the computing power scheduling center). The cloud computing power platform 200 may present the available computing power resources on its web page or APP. The user A may log in to the cloud computing power platform 200, select a suitable computing power demand (e.g., a device model of Avalonminer 1066, and a computing power size of $50^{TH}$/s) on the web page or APP of the cloud computing power platform 200, and add the account information (URL link address, user ID, user password of the computing power scheduling center) registered by user A at the selected computing power scheduling center 400 (e.g., F2pool.com), so that the computing power request can be generated from the information and then sent to the cloud computing power platform 200. After receiving the computing power request from user A, the cloud computing power platform 200 may send a configuration instruction to the computing device cluster 300, so that the computing device cluster 300 performs the following steps in response to the configuration instruction: allocating a corresponding miner as the target computing device to user A based on the computing power demand (e.g., a device model of Avalonminer 1066, and a computing power size of $50^{TH}$/s) selected by user A, and configuring the target computing device based on the account information (URL link address, user ID, user password of the computing power scheduling center) uploaded by user A in the computing power scheduling center. The target computing device configured in the computing device cluster 300 may request a task from the computing power scheduling center 400 specified by the user, and the computing power scheduling center 400 allocates a computing task (e.g., a blockchain-based mining task) to the target computing device, and then the target computing device may execute the computing task and submit the computing result to the computing power scheduling center 400 for confirmation, so that the computing power scheduling center 400 acquires the actual computing workload and computing revenue of the target computing device of user A according to the computing result as submitted. The user A may log in to the web page or APP interface of the third-party computing power scheduling center 400 based on the account information, thereby acquiring the computing power information of the target computing device.

Thus, by using the cloud computing power platform, a target computing device is virtually allocated to the user, and performs the computing task issued by a third-party computing power scheduling center, so that the complexity of a user acquiring the blockchain computing power is reduced. Also, the user can obtain the real computing power information of the target computing device allocated by the cloud computing power platform to the user through the third-party computing power scheduling center, so that the authenticity and reliability of computing power allocation is ensured.

In a possible embodiment, the computing power request includes at least one validity period. In the system, the cloud computing power platform 200 is further configured to send a reminder message to the user terminal 100 when the current time reaches a specific time point prior to the end of the validity period; and/or, the user terminal 100 is further configured to send a renewal request to the cloud computing power platform 200, and the cloud computing power platform 200 is further configured to update the validity period based on the renewal request; and/or the cloud computing power platform 200 is further configured to send a termination instruction to the computing device cluster 300 when the current time exceeds the validity period, and the computing device cluster 300 disconnects the target computing device from the computing power scheduling center 400 based on the termination instruction.

Specifically, at least one validity period may include a computing power validity period and an electric power validity period, and one of the computing power validity period and the electric power validity period that is proximate to the current time may be selected as the validity period. For example, user A may select a suitable option of the computing power resource (e.g., a device model of Avalonminer 1066, computing power of $50^{TH}$/s, computing power validity of 180 days, and electric power validity of 20 days) from the web page or APP of the cloud computing power platform 200 as the computing power demand, and add the account information (URL link address, user ID, user password of the computing power scheduling center) registered by user A at the computing power scheduling center 400, so that the computing power request is generated by the operation instructions and then sent to the cloud computing power platform 200. After receiving the computing power request from the user A, the cloud computing power platform 200 may send the configuration instruction to the computing device cluster 300 and start timing after the target computing device is running. If the current time is about to reach the electric power validity period, the cloud computing power platform 200 may send a reminder message to the user terminal 100, and if the current time has reached the electric power validity period, the cloud computing power platform 200 may send a termination instruction to the computing device cluster 300 to disconnect the target computing device from the computing power scheduling center. Further, the user terminal 100 may send a renewal request to the cloud computing power platform 200 (for example, send an electric power renewal request based on a power transaction), and the cloud computing power platform 200 may update the corresponding validity period after receiving the renewal request.

In a specific embodiment, the computing power request may further include transaction information. In the system, the cloud computing power platform 200 is further configured to verify the transaction information and send the configuration instruction to the computing device cluster 300 after the verification is passed. The transaction information may for example be payment information or order completion information.

In a possible embodiment, the cloud computing power platform 200 may further be configured to receive the operational state of the target computing device sent by the computing device cluster 300, and send the operational state of the target computing device to the user terminal 100. In this way, the user can conveniently view the operational state of the target computing device as allocated at the corresponding user terminal.

In a possible embodiment, the cloud computing power platform 200 may further be configured to establish a connection with the computing power scheduling center 400 based on the account information; and the computing power scheduling center 400 is further configured to send computing power information to the cloud computing power platform 200. In this way, the user can view the computing power information not only on the web page or APP interface of the third-party computing power scheduling center, but also view the actual computing power situation of the target computing device directly on the web page or APP interface of the cloud computing power platform via a pop-up window and other means, where the computing power information herein still comes from the third-party computing power scheduling center.

Optionally, the cloud computing power platform 200 may further establish a connection with another one or more computing power scheduling centers and acquire the revenue information of the another one or more computing power scheduling centers by means of an invocation interface, so that the user can compare the revenue of the computing power scheduling center selected by himself/herself with the revenue of other computing power scheduling centers on the web page or APP interface of the cloud computing power platform 200.

In a possible embodiment, the computing power information may include actual computing power and computing revenue of the target computing device, and the computing revenue is a digital certificate, which allows the user to intuitively view the real computing power situation and the revenue situation of the target computing device.

Figure 2:
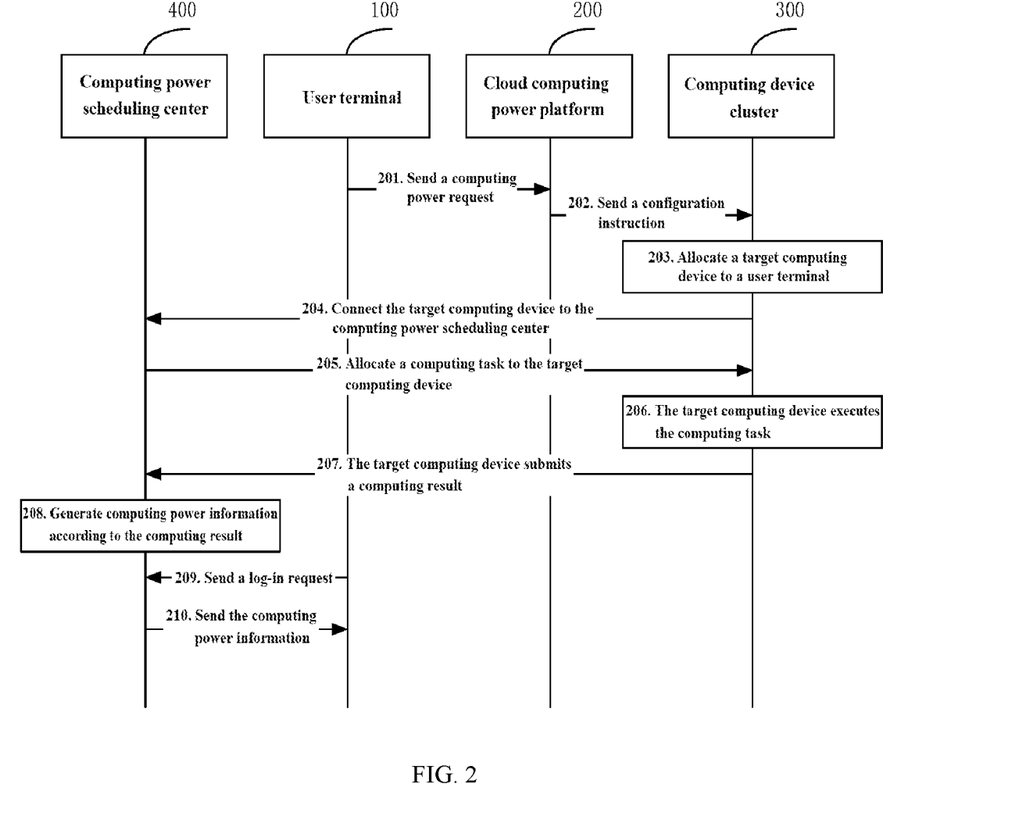
FIG. 2 is a schematic flowchart of a cloud computing power allocation method according to an embodiment of the present disclosure.

In embodiments of this specification, FIG. 2 is a flowchart of steps performed by each device in the computing power allocation system. As shown in FIG. 2, the embodiments may include following steps 201 to 210.

In step 201, the user terminal sends a computing power request to the cloud computing power platform. The computing power request includes a computing power demand and account information of a computing power scheduling center.

In step 202, the cloud computing power platform sends a configuration instruction to the computing device cluster.

In step 203, the computing device cluster allocates a target computing device meeting the computing power demand to the user terminal in response to the configuration instruction.

In step 204, the target computing device is configured to connect to the computing power scheduling center based on the account information.

In step 205, the computing power scheduling center allocates a computing task to the target computing device.

In step 206, the target computing device executes the computing task as allocated and acquires a computing result.

In step 207, the target computing device submits the computing result to the computing power scheduling platform.

In step 208, the computing power scheduling platform generates computing power information according to the computing result returned by the target computing device.

In step 209, the user terminal sends a log-in request to the computing power scheduling center by using the account information.

In step 210, the computing power scheduling center sends the computing power information to the user terminal.

Figure 3:
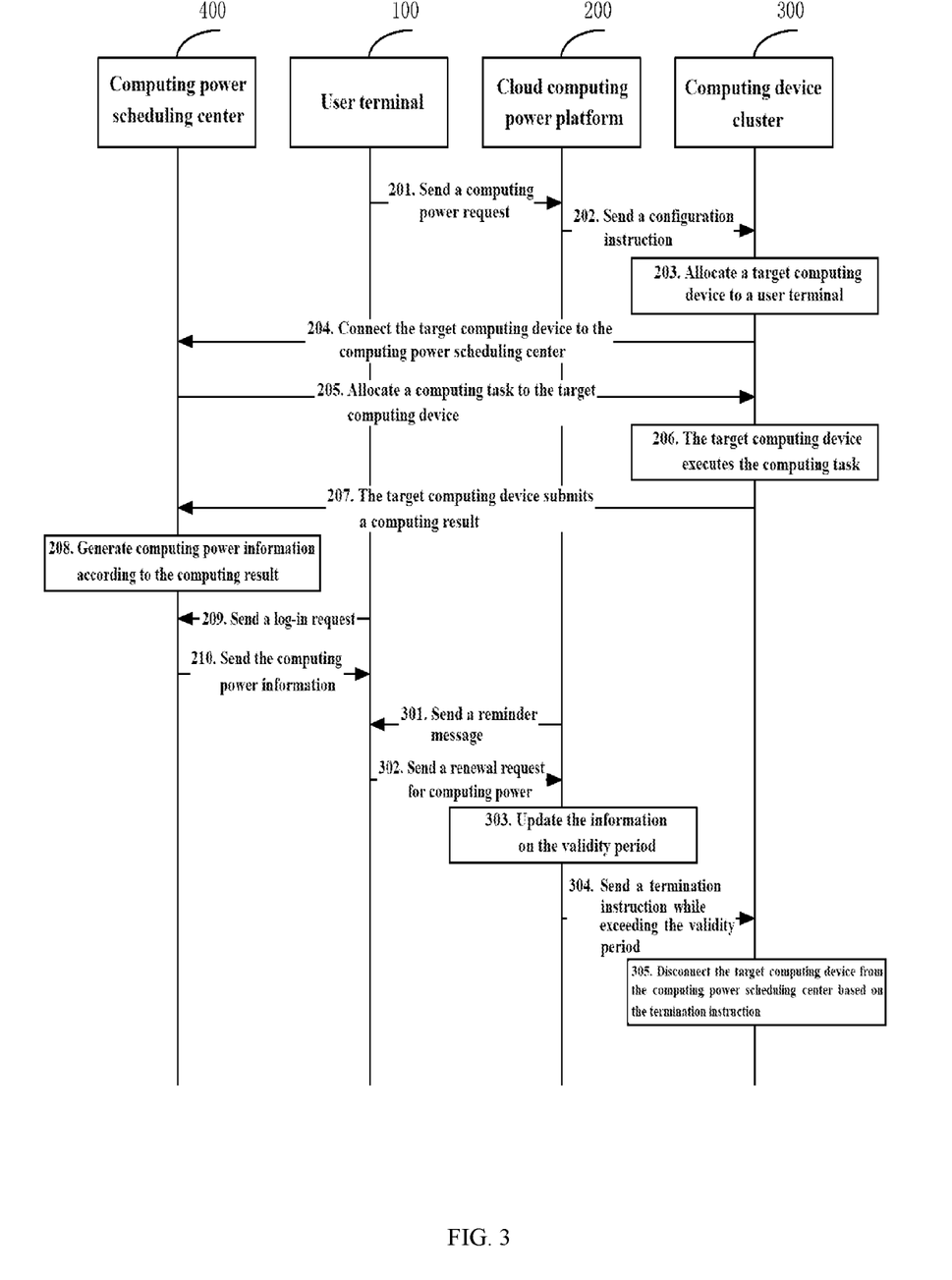
FIG. 3 is a schematic flowchart of a cloud computing power allocation method according to another embodiment of the present disclosure.

FIG. 3 is a schematic flowchart of a cloud computing power allocation method according to another possible embodiment of the present disclosure. Based on the above embodiment, the computing power request further includes at least one validity period, and the embodiment includes following steps 301 to 305.

In step 301, the cloud computing power platform sends a reminder message to the user terminal when the current time reaches a specific time point prior to the end of the validity period.

In step 302, the user terminal sends a renewal request to the cloud computing power platform.

In step 303, the cloud computing power platform updates the validity period based on the renewal request.

In step 304, the cloud computing power platform sends a termination instruction to the computing device cluster after the current time exceeds the validity period.

In step 305, the computing device cluster disconnects the target computing device from the computing power scheduling center based on the termination instruction.

The above steps 301, 302 and 303, and steps 304 and 305 can be performed separately or in combination, which is not specifically limited in this embodiment.

In a possible embodiment, the computing power request may further include transaction information. Based on the above embodiments, the cloud computing power platform may further verify the transaction information and send the configuration instruction to the computing device cluster after the verification is passed, so that the reliability of computing power allocation is ensured.

In a possible embodiment, based on the above embodiments, the cloud computing power platform may receive the operational state of the target computing device sent by the computing device cluster, and send the operational state of the target computing device to the user terminal, where the operational state herein may be operational parameter information of the target computing device, so that the user can conveniently view the operational state of the target computing device as allocated at the corresponding user terminal.

Figure 4:
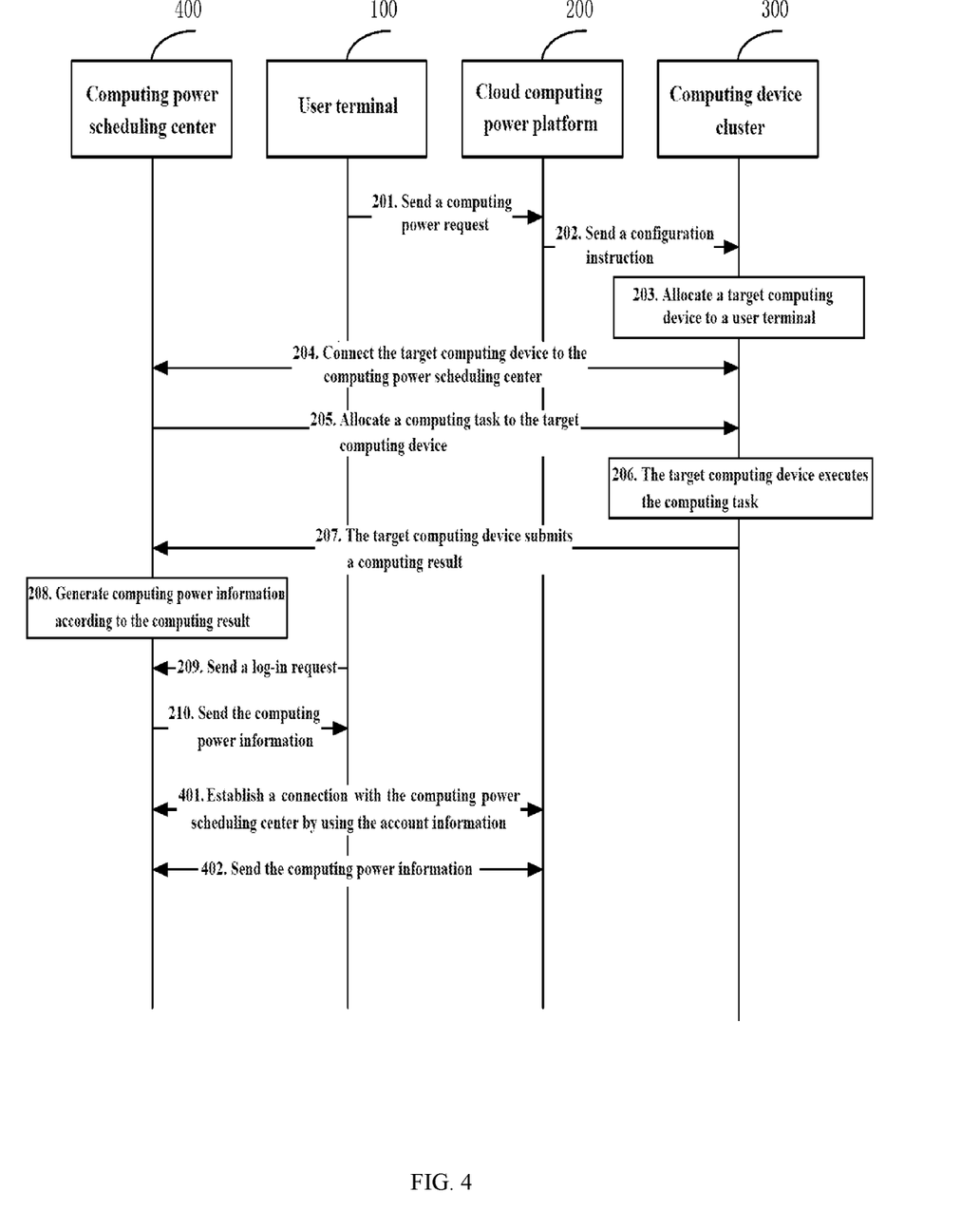
FIG. 4 is a schematic flowchart of a cloud computing power allocation method according to still another embodiment of the present disclosure.

FIG. 4 is a schematic flowchart of a cloud computing power allocation method according to another possible embodiment of the present disclosure. Based on the above embodiment, the embodiment includes following steps 401 to 402.

In step 401, the cloud computing power platform establishes a connection with the computing power scheduling center based on the account information.

In step 402, the computing power scheduling center sends computing power information to the cloud computing power platform.

In this way, the user can view the computing power information not only on the web page or APP interface of the third-party computing power scheduling center, but also view the actual computing power situation of the target computing device directly on the web page or APP interface of the cloud computing power platform via a pop-up window and other means, where the computing power information herein still comes from the third-party computing power scheduling center.

In a possible embodiment, the computing power information may include actual computing power and computing revenue of the target computing device, and the computing revenue is a digital certificate, which allows the user to intuitively view the real computing power situation and the revenue situation of the target computing device.

Figure 5:
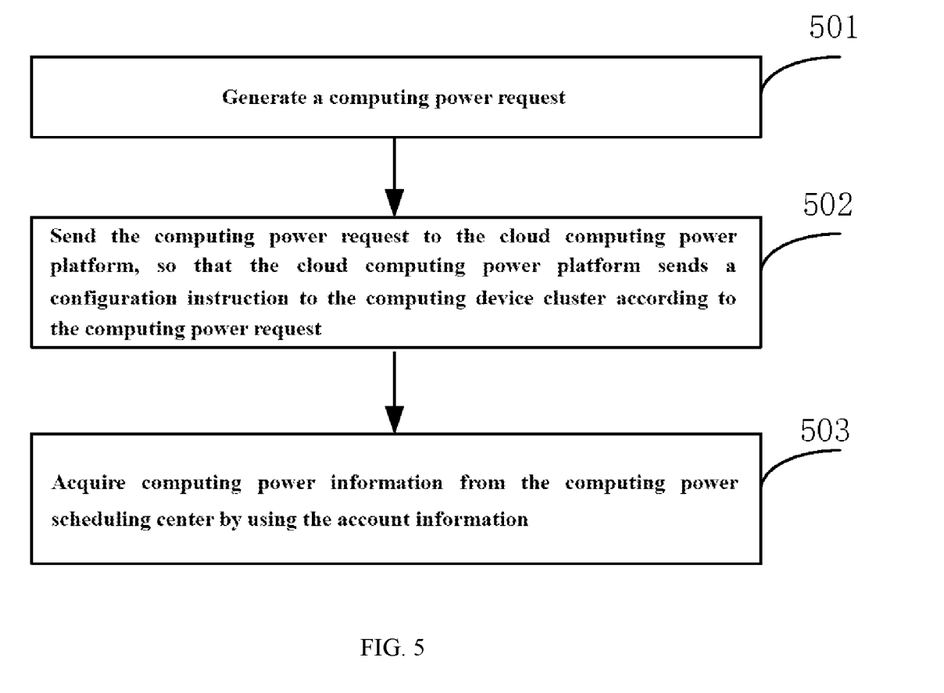
FIG. 5 is a schematic flowchart of a cloud computing power allocation method according to still another embodiment of the present disclosure.

Based on the same inventive concept as the above cloud computing power allocation system, embodiments of this specification provide a cloud computing power allocation method applicable to a user terminal. As shown in FIG. 5, the method includes following steps.

Step 501: generating a computing power request that includes a computing power demand and account information of a computing power scheduling center.

Step 502: sending the computing power request to the cloud computing power platform, so that the cloud computing power platform sends a configuration instruction to the computing device cluster.

The configuration instruction herein is used for allocating, to the user terminal, a target computing device meeting the computing power demand from the computing device cluster, and configuring, on the basis of the account information, the target computing device to execute a computing task issued by the computing power scheduling center.

Step 503: acquiring computing power information from the computing power scheduling center by using the account information.

The computing power information herein is determined according to a computing result of the computing task executed by the target computing device, and is acquired by logging in to the computing power scheduling center by using the account information.

In a possible embodiment, the computing power demand includes at least one validity period, and the method further includes: receiving a reminder message sent by the cloud computing power platform when current time reaches a reminder time point prior to the end of the validity period; and/or sending a renewal request to the cloud computing power platform, so that the cloud computing power platform updates the validity period based on the renewal request.

In a possible embodiment, the computing power request further includes transaction information, and the method further includes: sending the computing power request including the transaction information to the cloud computing power platform, so that the cloud computing power platform verifies the transaction information and sends the configuration instruction to the computing device cluster after the verification is passed.

In a possible embodiment, the method further includes receiving and presenting an operational state of the target computing device sent by the cloud computing power platform.

In a possible embodiment, the computing power information may include actual computing power and computing revenue of the target computing device, and the computing revenue is a digital certificate.

Figure 6:
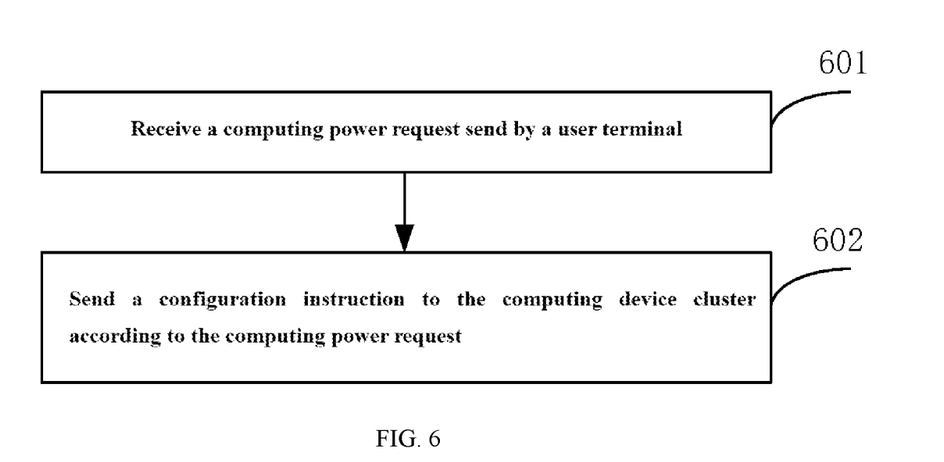
FIG. 6 is a schematic flowchart of a cloud computing power allocation method according to still another embodiment of the present disclosure.

Based on the same inventive concept as the above cloud computing power allocation system, embodiments of this specification provide a cloud computing power allocation method applicable to a cloud computing power platform. As shown in FIG. 6, the method includes following steps.

Step 601: receiving a computing power request sent by a user terminal.

The computing power request herein includes a computing power demand and account information of a computing power scheduling center.

Step 602: sending a configuration instruction to the computing device cluster according to the computing power request.

The configuration instruction herein is used for allocating, to the user terminal, a target computing device meeting the computing power demand from the computing device cluster, and configuring, on the basis of the account information, the target computing device to execute a computing task issued by the computing power scheduling center.

In a possible embodiment, the computing power demand includes at least one validity period, and the method further includes: sending a reminder message to the user terminal when the current time reaches a reminder time point prior to the end of the validity period; and/or receiving a renewal request sent by the user terminal to update the validity period; and/or sending a termination instruction to the computing device cluster when the current time exceeds the validity period, so that the target computing device is disconnected from the computing power scheduling center based on the termination instruction.

In a possible embodiment, the computing power request further includes transaction information, and the method further includes: verifying the transaction information, and sending the configuration instruction to the computing device cluster after the verification is passed.

In a possible embodiment, the method further includes: receiving an operational state of the target computing device sent by the computing device cluster, and sending the operational state of the target computing device to the user terminal.

In a possible embodiment, the method further includes: establishing a connection with the computing power scheduling center based on the account information; and receiving computing power information sent by the computing power scheduling center. The computing power information herein is determined according to a computing result of the computing task executed by the target computing device.

In a possible embodiment, the computing power information may include actual computing power and computing revenue of the target computing device, and the computing revenue is a digital certificate.

Based on the same inventive concept as the above cloud computing power allocation method applicable to a user terminal, embodiments of this specification provide a user terminal. The user terminal specifically includes: a processor adapted to implement one or more instructions, and a computer storage medium storing one or more instructions. The one or more instructions are adapted to be loaded by the processor and to execute the cloud computing power allocation method applicable to the user terminal.

Based on the same inventive concept as the above cloud computing power allocation method applicable to a computing power platform, embodiments of this specification provide a computing power platform. The computing power platform specifically includes: a processor adapted to implement one or more instructions, and a computer storage medium storing one or more instructions, where the one or more instructions are adapted to be loaded by the processor and to execute the cloud computing power allocation method applicable to the computing power platform.

The respective embodiments of the present disclosure are described in a progressive manner. The reference may be made to each other for the same or similar parts between the respective embodiments, and each embodiment focuses on the differences from other embodiments. In particular, for the embodiments of the device, apparatus and computer-readable storage medium, since they substantially similar to the embodiments of the method, the description thereon is simplified, and reference may be made to the description part on embodiments of the method for relevant aspects.

The system, method, user terminal and computing power platform according to embodiments of the present disclosure are in one-to-one correspondence. Thus, the method, user terminal and computing power platform have similar beneficial technical effects with the corresponding system. Since the beneficial technical effects of the system have been described in detail above, the beneficial technical effects of the method, user terminal and computing power platform will not be repeated here.

Those skilled in the art should understand that the embodiments of the present disclosure may be provided as a method, a system, or a computer program product. Therefore, the present disclosure may be in the form of full hardware embodiments, full software embodiments, or a combination thereof. Moreover, the present disclosure may be in the form of a computer program product that is implemented on one or more computer-usable storage medium (which includes, but is not limited to, magnetic disk storage, CD-ROM, optical storage) containing computer-usable program codes.

The present disclosure is described referring to the flowchart and/or block diagram of the method, device (system) and computer program product according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, a special-purpose computer, a built-in processor or other programmable data processing devices to produce a machine, so that the instructions executed by the processor of a computer or other programmable data processing devices may produce a device for implementing the functions specified in one or more flows in the flowchart and/or one or more blocks in the block diagram.

Such computer program instructions may also be stored in a computer-readable storage that can guide a computer or other programmable data processing devices to operate in a specific mode, so that the instructions stored in the computer-readable storage may produce a manufacture including an instruction device, where the instruction device may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices provide steps for implementing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random-access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can implement the information storage by any method or technology. The information may be computer-readable instructions, data structures, program modules, or other data. Examples of the computer storage medium include, but are not limited to, a phase change memory (PRAM), a static random-access memory (SRAM), a dynamic random-access memory (DRAM), other types of random-access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved when all the operations as shown are performed. Additionally, or alternatively, some steps may be omitted, a plurality of steps may be combined into one step for execution, and/or one step may be decomposed into multiple steps for execution.

Although the spirit and principles of the present disclosure have been described with reference to several embodiments, it should be understood that the present disclosure is not limited to the embodiments as disclosed, nor does the division of the aspects imply that the features in those aspects cannot be combined for benefit, such division is only for the convenience of presentation. The present disclosure is intended to cover various modifications and equivalent arrangements included within the spirit and scope of the appended claims.

What is claimed is:

1. A cloud computing power allocation method applicable to a user terminal, the method comprising:
   generating a computing power request which comprises a computing power demand and account information of a computing power scheduling center;
   sending the computing power request to a cloud computing power platform, so that the cloud computing power platform sends a configuration instruction to a computing device cluster according to the computing power request, wherein the configuration instruction is to allocate, to the user terminal, a target computing device meeting the computing power demand from the computing device cluster, and configure, on the basis of the account information, the target computing device to execute a computing task issued by the computing power scheduling center; and
   acquiring computing power information from the computing power scheduling center by using the account information, wherein the computing power information is determined according to a computing result from the target computing device.

2. The method according to claim 1, wherein the computing power demand comprises at least one validity period, and the method further comprises:
   receiving a reminder message sent by the cloud computing power platform when current time reaches a reminder time point prior to the end of the validity period; and/or
   sending a renewal request to the cloud computing power platform, so that the cloud computing power platform updates the validity period based on the renewal request.

3. The method according to claim 1, wherein the computing power request further comprises transaction information, and the method further comprises:
   sending the computing power request comprising the transaction information to the cloud computing power platform, so that the cloud computing power platform verifies the transaction information and sends the configuration instruction to the computing device cluster after verification is passed.

4. The method according to claim 1, further comprising:
   receiving and presenting an operational state of the target computing device sent by the cloud computing power platform.

5. The method according to claim 1, wherein the computing power information comprises actual computing power and computing revenue of the target computing device, and the computing revenue is a digital certificate.

6. A user terminal, comprising: a processor adapted to implement one or more instructions, and a computer storage medium storing one or more instructions, wherein the one or more instructions are adapted to be loaded by the processor and to execute the method according to claim 1.

7. A cloud computing power resource scheduling method applicable to a cloud computing power platform, the method comprising:
   receiving a computing power request sent by a user terminal, wherein the computing power request comprises a computing power demand and account information of a computing power scheduling center; and
   sending a configuration instruction to a computing device cluster according to the computing power request, wherein the configuration instruction is to allocate, to the user terminal, a target computing device meeting the computing power demand from the computing device cluster, and configure, on the basis of the account information, the target computing device to execute a computing task issued by the computing power scheduling center.

8. The method according to claim 7, wherein the computing power demand comprises at least one validity period, and the method further comprises:
   sending a reminder message to the user terminal when current time reaches a reminder time point prior to the end of the validity period; and/or
   receiving a renewal request sent by the user terminal to update the validity period; and/or
   sending a termination instruction to the computing device cluster when the current time exceeds the validity period, so that the target computing device is disconnected from the computing power scheduling center based on the termination instruction.

9. The method according to claim 7, wherein the computing power request further comprises transaction information, and the method further comprises:
   verifying the transaction information, and sending the configuration instruction to the computing device cluster after verification is passed.

10. The method according to claim 7, further comprising:
    receiving an operational state of the target computing device sent by the computing device cluster; and
    sending the operational state of the target computing device to the user terminal.

11. The method according to claim 7, further comprising:
    establishing a connection with the computing power scheduling center based on the account information; and
    receiving computing power information sent by the computing power scheduling center, wherein the computing power information is determined according to a computing result of the computing task executed by the target computing device.

12. The method according to claim 11, wherein the computing power information comprises actual computing power and computing revenue of the target computing device, and the computing revenue is a digital certificate.

13. A cloud computing power platform, comprising: a processor adapted to implement one or more instructions, and a computer storage medium storing one or more instructions, wherein the one or more instructions are adapted to be loaded by the processor and to execute the method according to claim 7.

14. A cloud computing power allocation system, comprising:
- a user terminal, a cloud computing power platform, a computing device cluster and a computing power scheduling center;
- the user terminal is configured to send a computing power request to the cloud computing power platform, wherein the computing power request comprises a computing power demand and account information of a computing power scheduling center;
- the cloud computing power platform is configured to send a configuration instruction to the computing device cluster according to the computing power request;
- the computing device cluster is configured to allocate a target computing device meeting the computing power demand to the user terminal in response to the configuration instruction, and configure the target computing device to connect to the computing power scheduling center based on the account information;
- the computing power scheduling center is configured to allocate a computing task to the target computing device and generate computing power information based on a computing result returned by the target computing device; and
- the user terminal is further configured to receive the computing power information sent by the computing power scheduling center.

15. The system according to claim 14, wherein the computing power request comprises at least one validity period;
- the cloud computing power platform is further configured to send a reminder message to the user terminal when current time reaches a specific time point prior to the end of the validity period; and/or
- the user terminal is further configured to send a renewal request to the cloud computing power platform, and the cloud computing power platform is further configured to update the validity period based on the renewal request; and/or
- the cloud computing power platform is further configured to send a termination instruction to the computing device cluster when the current time exceeds the validity period, and the computing device cluster disconnects the target computing device from the computing power scheduling center based on the termination instruction.

16. The system according to claim 14, wherein the computing power request further comprises transaction information, and
- the cloud computing power platform is further configured to verify the transaction information, and send the configuration instruction to the computing device cluster after verification is passed.

17. The system according to claim 14, wherein
- the cloud computing power platform is further configured to receive an operational state of the target computing device sent by the computing device cluster, and send the operational state of the target computing device to the user terminal.

18. The system according to claim 14, wherein
- the cloud computing power platform is further configured to establish a connection with the computing power scheduling center based on the account information; and
- the computing power scheduling center is further configured to send computing power information to the cloud computing power platform.

19. The system according to claim 14, wherein the computing power information comprises actual computing power and computing revenue of the target computing device, and the computing revenue is a digital certificate.

\* \* \* \* \*